United States Patent
Tang et al.

(10) Patent No.: US 6,711,157 B1
(45) Date of Patent: Mar. 23, 2004

(54) SYSTEM AND METHOD OF CREATING SUBSCRIBER SERVICES IN AN IP-BASED TELECOMMUNICATIONS NETWORK

(75) Inventors: Jingrong Tang, Nepean (CA); Anthony P. R. White, Ottawa (CA); Bernard Pagurek, Nepean (CA); Roch Glitho, Montreal (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/578,597

(22) Filed: May 25, 2000

Related U.S. Application Data

(60) Provisional application No. 60/150,469, filed on Aug. 24, 1999.

(51) Int. Cl.[7] ............................................. H04L 12/66
(52) U.S. Cl. .................. 370/352; 370/485; 379/221.08; 379/221.15
(58) Field of Search ................................. 370/352, 353, 370/354, 485, 487; 379/221.08, 221.09, 221.1, 221.11, 221.12, 221.15, 243, 265.01, 88.17, 142.07, 157, 164

(56) References Cited

U.S. PATENT DOCUMENTS

| | | | |
|---|---|---|---|
| 5,557,655 A | 9/1996 | Lantto | 379/58 |
| 5,907,607 A | 5/1999 | Waters et al. | 379/207 |
| 5,915,008 A | 6/1999 | Dulman | 379/201 |
| 6,003,031 A * | 12/1999 | Hartikainen et al. | 707/10 |
| 6,363,430 B1 * | 3/2002 | Thomas | 709/245 |
| 6,411,697 B1 * | 6/2002 | Creamer et al. | 379/201.12 |
| 6,421,339 B1 * | 7/2002 | Thomas | 370/352 |
| 2001/0002473 A1 * | 5/2001 | Waldo et al. | 709/229 |

FOREIGN PATENT DOCUMENTS

| | | |
|---|---|---|
| EP | 0625750 A2 | 5/1995 |
| GB | 2320344 A | 6/1998 |

* cited by examiner

*Primary Examiner*—Chi Pham
*Assistant Examiner*—Anh Vu Ly
(74) *Attorney, Agent, or Firm*—Smith & Danamraj, PC

(57) ABSTRACT

A system and method of creating subscriber services in an Internet Protocol (IP)-based telecommunications network. A service creation architecture includes a Service Component Creator (SCC) that creates service proxy objects, and posts them on a Lookup Service (LUS). The LUS is accessible through the Internet by Enterprise Service Creators (ESCs). The ESCs download the posted service proxy objects from the LUS, and customize the downloaded objects to create customized services for enterprise users. The ESCs upload the customized service proxy objects to an Enterprise LUS, and the, Enterprise LUS downloads the customized service proxy objects to a Service Management Unit (SMU) serving the end user. A gatekeeper serving the end users utilizes the service proxy code downloaded to the SMU to determine the location of a Service Implementation Repository (SIR) that stores actual service code for implementing the customized service. The gatekeeper then downloads the actual service code from the SIR, constructs a customized User Service Agent (USA) that includes the actual service code, and sends the customized USA to an agency (mobile agent platform) at the user's terminal.

10 Claims, 5 Drawing Sheets

SYSTEM AND METHOD OF CREATING SUBSCRIBER SERVICES IN AN IP-BASED TELECOMMUNICATIONS NETWORK

PRIORITY STATEMENT UNDER 35 U.S.C. § 119(e) & 37 C.F.R. § 1.78

This nonprovisional application claims priority based upon the prior U.S. provisional patent application entitled, "System and Method of Creating Subscriber Services in an Internet Protocol (IP) Telecommunications Network", application Ser. No. 60/150,469, filed Aug. 24, 1999, in the names of Jingrong Tang, Anthony P. R. White, Bernard Pagurek, and Roch Glitho.

BACKGROUND OF THE INVENTION

1. Technical Field of the Invention

This invention relates to telecommunication systems and, more particularly, to a system and method of creating subscriber services in an Internet Protocol (IP)-based telecommunications network.

2. Description of Related Art

In the classical telephony world which is based on circuit switched networks, a number of service architectures have been developed in the last decade, for example, the Intelligent Networks (IN) framework, Telecommunications Management Network (TMN), Telecommunications Information Networking Architecture (TINA), etc. The purpose of the service architectures is to increase the quality and range of services offered in communication networks. In order to compete with classical telephony in today's market, the challenges that IP telephony faces is to offer not only the same high-quality voice calls, but also a set of call features (i.e., advanced subscriber services) which classical telephony offers today.

In existing IP-based telecommunications networks, subscriber services may be created in two alternative ways. In a first alternative, the services may be hard-coded into a switch such as an H.323 gatekeeper or a Session Initiation Protocol (SIP) proxy server. In this instance, only the equiplent manufacturer of the switch can create services. In a second alternative, a service node such as a Service Control Point (SCP) may be utilized for service creation. If an SCP is used, and the service creation environment is open, then in addition to the equipment manufacturer, specialized software houses can create services to a limited extent. The SCP is manufactured, however, with a service creation environment in which a limited number of basic software components are provided for building services. Although the specialized software houses can create services, they are still limited by the components supplied by the manufacturer in the service creation environment in the SCP.

Thus, services made available today to end users by Internet Telephony Service Providers (ITSPs) are limited to the services that can be created by manufacturers or specialized software houses from the components supplied by the manufacturers. This results in only a limited set of services being available in the ITSP domain. Additionally, service providers cannot make new services available in real time to their subscribers.

In order to overcome the disadvantage of existing solutions, it would be advantageous to have a system and method of creating subscriber services in an IP-based telecommunications network that enables multiple players, including specialized software houses and ITSPs, to create a full range of advanced services that are open, flexible, and scalable. The system should also provide a service architecture that is open, distributed, and flexible. The present invention provides such a system and method.

SUMMARY OF THE INVENTION

In one aspect, the present invention is a method of creating subscriber services in an Internet Protocol (IP)-based telecommunications network. The method includes the steps of creating by a Service Component Creator (SCC), a service proxy object; and posting by the SCC, the service proxy object to a Lookup Service (LUS) that is accessible through the Internet. This is followed by downloading through the Internet by an Enterprise Service Creator (ESC), the posted service proxy object; and customizing by the ESC, the downloaded service proxy object to create a customized service for an end user.

In another aspect, the present invention is a method of provisioning a supplementary service upon request from an end user in an IP-based telecommunications network. The method includes the steps of receiving in a Service Management Unit (SMU), a service subscription request from the end user; multicasting by the SMU, the service subscription request over an Enterprise Local Area Network (LAN) to discover Enterprise LUSs that have supplementary services available for downloading; and sending by each Enterprise LUS, a list of its supplementary services to the SMU. The SMU then constructs a service subscription form listing the supplementary services available, and sends the service subscription form to the end user. This is followed by receiving in the SMU, an indication of a service selected by the user, and service-related data entered by the user. The SMU then sends a service request to the LUS that contains the requested service, and downloads service proxy code for the requested service from the LUS. A gatekeeper associated with the SMU and the end user then determines from the proxy code, a location of a Service Implementation Repository (SIR) storing actual service code for implementing the requested service. The gatekeeper then downloads the actual service code from the SIR, constructs a customized User Service Agent (USA) that includes the actual service code, and sends the customized USA to an agency at the user's terminal.

In yet another aspect, the present invention is a method of setting up a call from a first end user to a second end user and forwarding the call to a third end user utilizing a USA and a Call Agent (CA) in an IP-based telecommunications network having a gatekeeper agency and an SMU serving the end users. The method begins by sending the USA from the second end user to the gatekeeper agency, the USA including a call forwarding service for the second end user. Upon initiation of the call by the first end user, Basic Call Processing (BCP) functions in a terminal of the first end user are invoked, and as a result, a setup message is sent from the first end user to the second end user via the gatekeeper agency. This is followed by checking a user profile in the SMU to determine whether the second end user subscribes to the call forwarding service, and if so, activating the second end user's USA. The USA then instantiates the CA which implements an applicable call model. The CA then performs call processing and routes the call to the third end user.

In another aspect, the present invention is a service creation architecture in an IP-based telecommunications network for creating subscriber services. The architecture includes an SCC for creating a service proxy object, and an LUS in which a service proxy object created by the SCC is posted. The LUS is accessible through the Internet by an ESC. The ESC comprises means for downloading the posted service proxy object from the LUS, and means for customizing the downloaded service proxy object to create a customized service for enterprise users.

In yet another aspect, the present invention is a system for provisioning a supplementary service upon request from an end user in an IP-based telecommunications network. The system includes an SMU for receiving a service subscription request from the end user, at least one Enterprise LUS that includes supplementary services available for downloading, and an Enterprise LAN linking the SMU, the LUSs, and the end user. The Enterprise LAN is utilized by the SMU to multicast the service, subscription request to the LUSs. The system also includes means within each Enterprise LUS for sending a list of its supplementary services to the SMU, means within the SMU for constructing a service subscription form listing the supplementary services available, and means for sending the service subscription form from the SMU to the end user. The SMU also includes means for receiving an indication of a service selected by the user, and service-related data entered by the user; means for sending a service request to the LUS that contains the requested service; and means for downloading service proxy code for the requested service from the LUS to the SMU. The system also includes an SIR for storing actual service code for implementing the requested service; and a gatekeeper associated with the SMU and the end user. The gatekeeper includes means for determining a location of the SIR, means for downloading the actual service code from the SIR, and means for constructing a customized USA that includes the actual service code. Finally, the system includes means for sending the customized USA from the gatekeeper to an agency at the user's terminal.

In still yet another aspect, the present invention is a system for setting up a call from a first end user to a second end user and forwarding the call to a third end user utilizing a USA and a CA in an IP-based telecommunications network. The system includes a gatekeeper agency serving the end users, an SMU managing services for the end users, and means for sending the USA from the second end user to the gatekeeper agency. The USA includes a call forwarding service for the second end user. The system also includes a first end user terminal that includes BCP functions, the BCP functions being invoked upon initiation of the call by the first end user. As a result of the BCP functions being invoked, the first end user terminal sends a setup message to the second end user via the gatekeeper agency. A user profile in the SMU indicates whether the second end user subscribes to the call forwarding service, and the SMU includes means for activating the second end user's USA when the user profile indicates that the second end user subscribes to the call forwarding service. The USA includes means for instantiating the CA which implements an applicable call model, and performs call processing for routing, the call to the third end user.

BRIEF DESCRIPTION OF THE DRAWINGS

The invention will be better understood and its numerous objects and advantages will become more apparent to those skilled in the art by reference to the following drawings, in conjunction with the accompanying specification, in which.

DETAILED DESCRIPTION OF EMBODIMENTS

Figure 1:
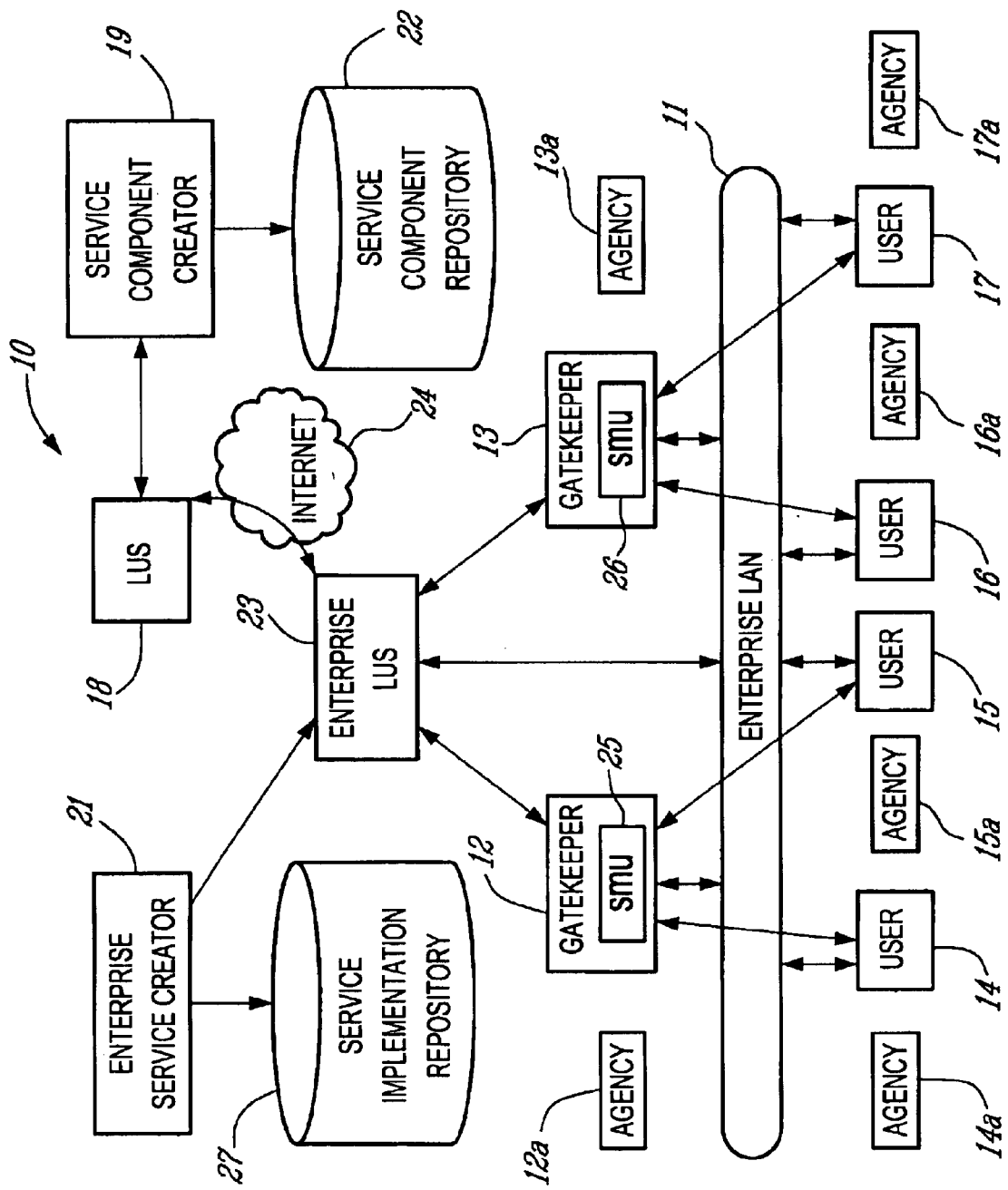
FIG. 1 is a simplified block diagram of the advanced service architecture for H.323 IP telephony of the present invention.

The traditional telephone system has very primitive end terminals (telephones) and considerable intelligence inside the network. Advanced service architectures separate call setup and call processing functions. In general, the Internet represents a different balance, with intelligent end terminal s (computers) and a simple set of functions inside the switches of the network.

In order to realize this view of IP telephony, appropriate protocols and technologies are needed. Currently there are two protocols that address this issue, the International Telecommunications Union—Telecommunications Standardization Sector (ITU-T) H.323 and the Internet Engineering Task Force (IETF) Session Initiation Protocol (SIP). Supplementary services supported by H.323 are specified in H.450.x. Each of the defined supplementary services has its own specification. The H.323 specification does not address service control and management. In addition, there is no possibility for third-parties to create services. However there is obviously room left for developers to design flexible service architectures using enabling technologies such as mobile agents.

The present invention provides a mechanism for multi-player service creation. It provides a service creation environment where not only equipment suppliers, but also individual ITSPs and specialized software houses can create a full range of services from different components. If it is desired to create a service, and the service creator does not have all of the needed components in his domain, the present invention provides a method of acquiring the needed components from third parties.

In the world of service creation, there are service creators and there are creators of the components that can be used to create the services. The present invention provides a process by which a component creator creates components (such as Component A and Component B) and posts them for other users. Lookup Services (LUSs) are locations where components are posted for others to utilize. All service creators are linked to the LUSs, and if a service creator needs a particular component (such as Component A or Component B), he broadcasts a request for the needed component to the LUSs. The LUSs then search for the component, and one of them finds the component and sends a response to the service creator. When the service creator gets a response, he then downloads the required component from the responding LUS.

An agent can be described as a software component that performs a specific task autonomously on behalf of a person or organization. It contains some level of intelligence, ranging from predefined rules to self-learning Artificial Intelligence (AI) mechanisms. Thus agents may operate rather asynchronously to the user and may communicate with the user, system resources, and other agents as required to perform their tasks. They are often event- or time-triggered.

A mobile agent is not bound to the host where it begins execution. It has a unique ability to transport itself from one host in a network to another. As it travels, it performs work on behalf of the network user. Agent mobility provides intelligent agents with the potential to influence traditional methods of communications and service realization. It allows users to tailor services according to their specific needs and preferences. In the past, the main motivations for the application of mobile agents were the lack of capacity to execute programs locally, and the desire to share resources and improve load-balancing in a distributed system. In contrast to these concepts designed for rather specific or closed environments, the agent concepts utilized in the present invention aim for open environments, for example, the Internet. Flexibility is a key design issue for the network service architecture in order to adapt quickly to changing customer service demands. The mobile agent paradigm and the emerging agent technologies are considered key for implementing open, flexible, and scalable services.

Enabling Technologies

The Java programming language, develop by Sun Microsystems, has a number of advantages that make it particularly appropriate for mobile agent technology. Its main appeal for agents is its portability. This means that any system with sufficient resources can host Java programs.

The JavaBeans specification is an object-oriented programming interface that is used to build reusable application or program building blocks called "components" that can be deployed in the network or any major operating system. Ideally, any Java components conforming to the JavaBeans component model can be reused in any other JavaBean-compliant application. Every Bean not only complies with the JavaBean model, it also carries with it all its properties and methods which can be easily garnered through introspection—a JavaBean property whereby any visual builder tool can analyze and report how a Bean operates.

Jini technology takes advantage of the Java language. It brings to the network, facilities for distributed computing, network based services, seamless expansion, reliable smart devices, and easy administration. It provides lookup services and a network bulletin board (or blackboard) for all services on the network. Jini allows the search of services connected by the communication infrastructure and stores not only pointers to the service on the network, but also the code and/or code pointers for these services.

The components of the Jini system can be segmented into three categories: infrastructure, programming model, and services. The infrastructure is the set of components that enables building a federated Jini system, while the services are the entities within the federation. The programming model comprises interfaces that enable the construction of reliable, services.

The present invention is based on the Intelligent Network (IN) call model. IN services are based on additional service logic and data on top of different switched telecommunications networks. Centralized service nodes known as Service Control Points (SCPs) control the telecommunications network via a dedicated out-of-band signaling network (i.e., the international Signaling System No. 7 (SS7) network). The bearer switching nodes, known as Service Switching Points (SSPs) provide only the basic call processing capabilities. IN service deployment and management is realized through a Service Management System (SMS) which interacts with IN elements via a data communication network. Since the SSPs and the SCP have to interact for each IN service call (usually multiple times), the signaling network and the central SCP may become serious bottlenecks. Furthermore, SCP failures may result in global service unavailability.

The IN platform, however, provides greater flexibility for service creation in general and also for the tailoring of services to suit the exact requirements of a particular customer. IN-based services rely on Service Independent Building Blocks (SIBs) which are the smallest units in service creation. SIBs are reusable and can be chained together in various combinations to realize services. They are defined to be independent of the specific service and technology for which or on which they are realized.

The present invention is a mobile agent (MA)-based advanced service architecture for implementing H.323 supplementary services using the widely accepted IN service provisioning basis and enabling technology (MA, Jini/JavaBeans). User Service Agents (USAs) contain a call model such as the IN call model, and one or more Service Implementation Repository URLs referring to where the service code can be found. For service execution, the IN call model is downloaded and then executes the service.

FIG. 1 is a simplified block diagram of the advanced service architecture 10 for H.323 IP telephony. The architecture provisions H.323 supplementary services in a uniform manner, supporting dynamic deployment of services. Mobile agent platforms (agencies) are introduced into the devices that are connected to an Enterprise LAN 11. H.323 supplementary services are realized by means of mobile service agents. Service agents are deployed to the service users (i.e., the call parties) which makes the service architecture open, distributed, and flexible.

As illustrated, H.323 gatekeepers 12 and 13, and H.323 terminals (users) 14 through 17 are connected to the Enterprise LAN 11. Mobile agent platforms (Agencies) 12a through 17a are attached to each gatekeeper/terminal and provide an agent execution environment. User terminals join a gatekeeper's zone through a gatekeeper discovery process and an end-point registration process. A Lookup Service (LUS) 18 function s as a blackboard where all the available services' proxy code (interface of a service) is placed. A Service Component Creator (SCC) 19 is responsible for creating components. The components are made available to an Enterprise Service Creator (ESC) 21 and are advertised on the LUS. All of the service components created by the SCC are stored in a Service Component Repository (SCR) 22. The service components can be assembled into new services by the SCC. The SCC and the SCR bring opportunities for third-party service creators and providers, enabling them to compete in the service market.

The LUS 18 may be local or remote; remote LUSs are linked to each other and to an Enterprise LUS 23 by the Internet 24. Each of the gatekeepers 12 and 13 is shown to include a Service Management Unit (SMU) 25 and 26, respectively. An SMU may be implemented in the gatekeeper, or may be completely separated from the gatekeeper. The SMU manages service subscriptions using protocols not defined by H.323 (for example, HTTP). The SMU dynamically upgrades services and may be involved in ongoing network management of the services. The SMU can discover the Enterprise LUS 23 using a multicast protocol; a unicast protocol is used to discover remote LUSs (such as LUS 18) that are outside of the Enterprise LAN 11. In the latter case, the SMU has to know where the remote LUS is located before sending out a request to the remote LUS. The ESC 21 is responsible for customizing/assembling the service components into services provided to the end-users 14–17 using the available code from a Service Implementation Repository (SIR) 27.

The service architecture allows for open service creation. Supplementary services may be created by a different SCC using service components from a different SCR. Service utilization is realized by first activating the calling party's User Service Agent (USA) which ultimately results in activating the called party's USA. A call agent (CA) is instantiated as a result of the USA creating a new CA. The CA is a mobile agent which implements a specific call model for a particular end user, and makes use of basic call processing functions to control the call setup.

The architecture also supports universal access to the service through the Jini Lookup process. Service customization is also supported by the service architecture. Each user connected to the network can define its own'service data. Service logic is not embedded in network nodes, but ultimately in the end user's terminal, thus making the service architecture highly distributed.

Figure 2:
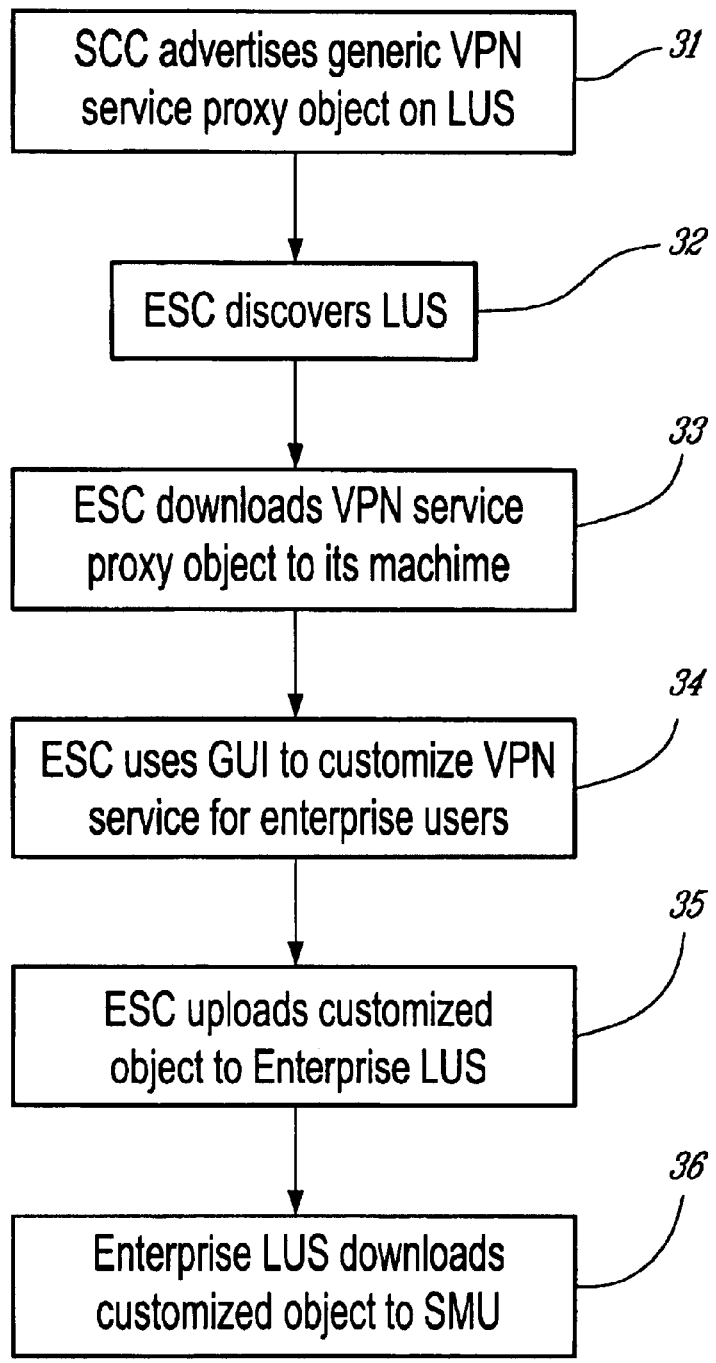
FIG. 2 is a flow chart illustrating a method of discovering, acquiring, and customizing services according to the teachings of the present invention.

FIG. 2 is a flow chart illustrating the method of discovery, acquisition, and customization of services according to the teachings of the present invention. The method is described with reference to FIGS. 1 and 2. At step 31, the SCC 19 advertises a generic Virtual Private Network (VPN) service proxy object on the LUS 18. The ESC 21 discovers the LUS at step 32, and downloads the VPN service proxy object to its machine at 33. At step 34, the ESC uses, for example, a Graphical User Interface (GUI) to customize the VPN service for enterprise users. At step 35, the ESC uploads the customized object to the Enterprise LUS 23. Finally, at step 36, the Enterprise LUS downloads the customized object to the SMU serving the end user (for example, SMU 25).

Figure 3A:
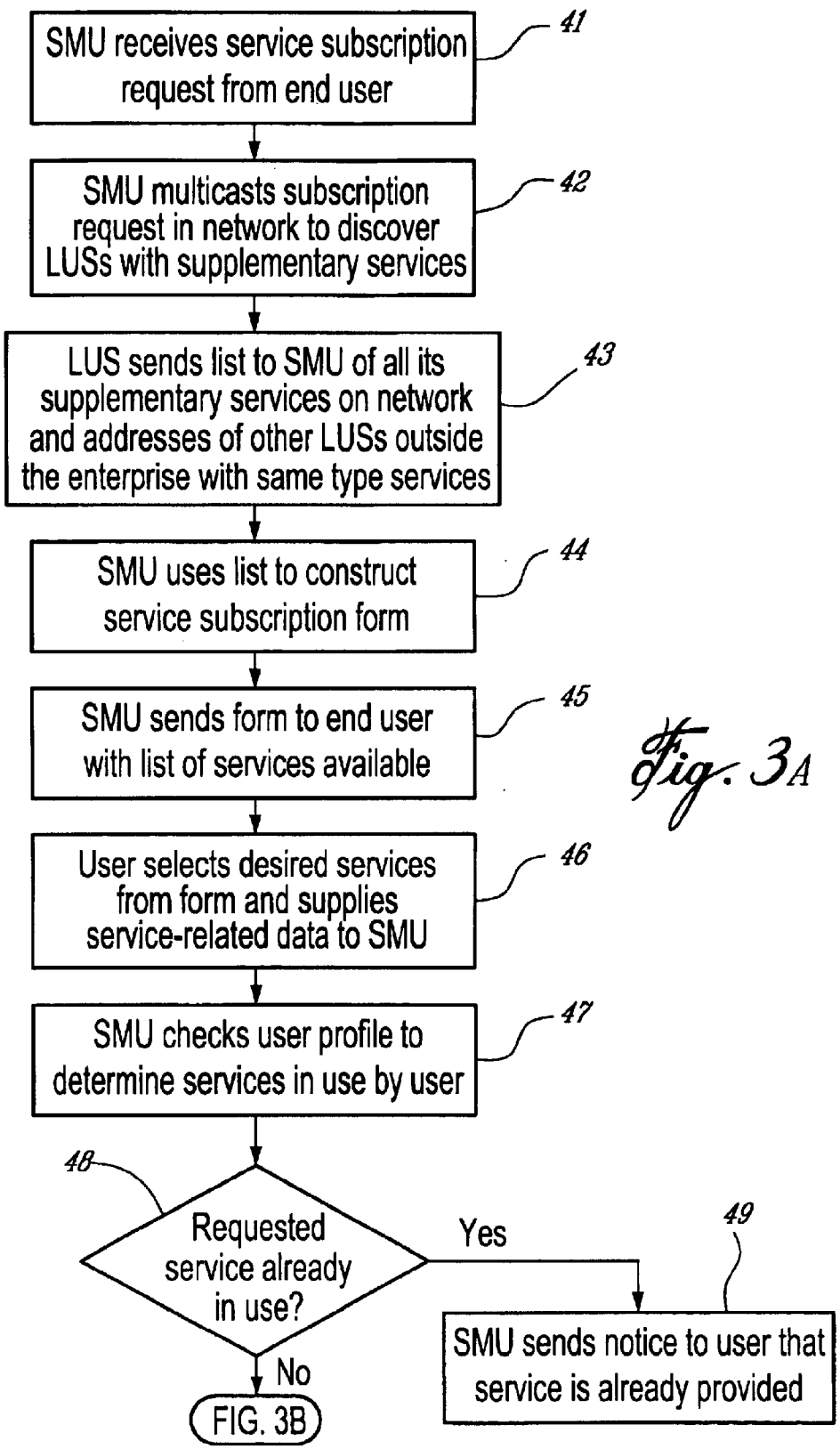
FIGS. 3A–3B are a flow chart illustrating the steps of the method of the present invention when provisioning a service upon request from an end user.
Figure 3B:
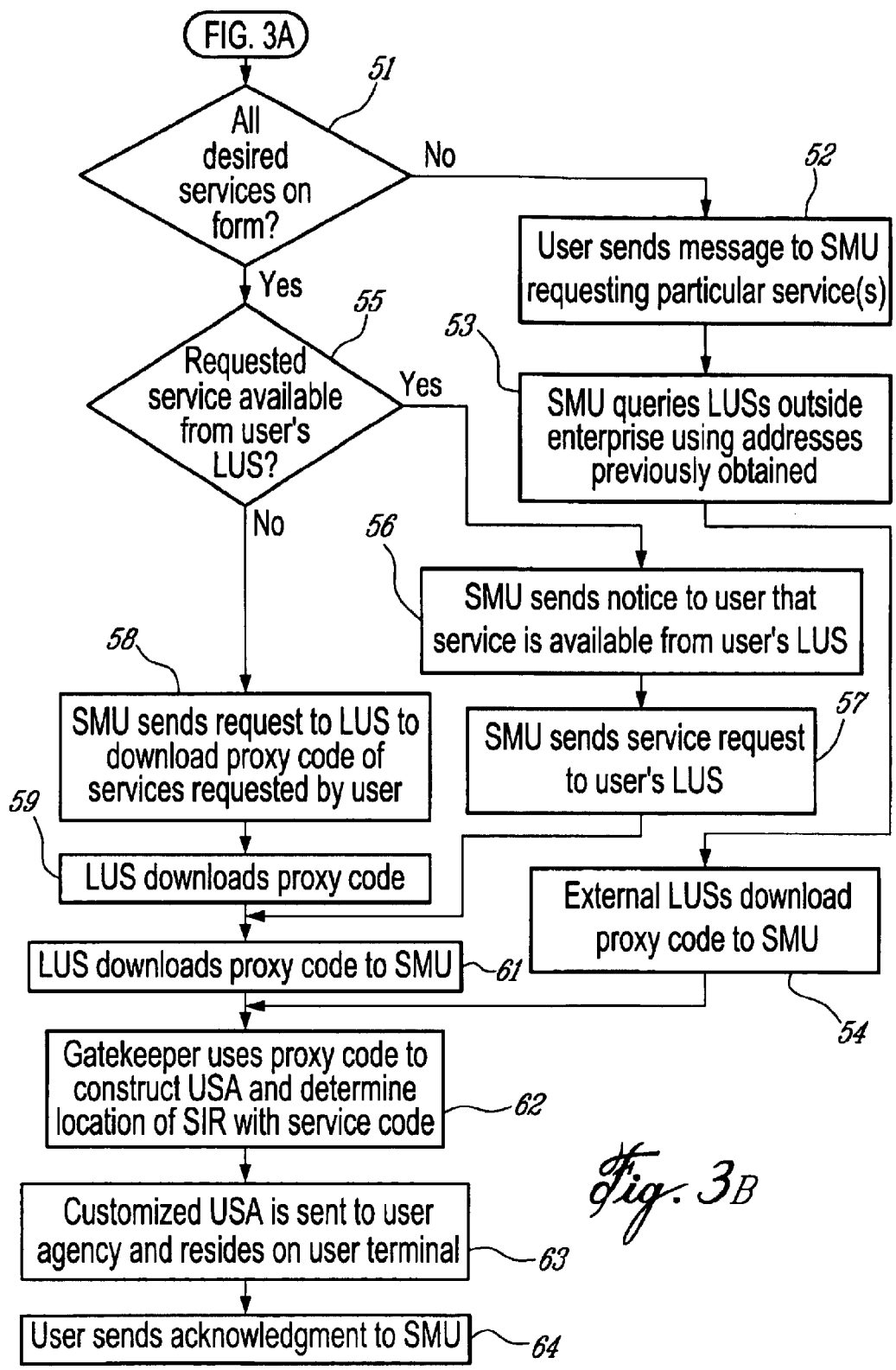

FIGS. 3A–3B are a flow chart illustrating the steps of the method of the present invention when provisioning a service upon request from an end user. At step 41 of FIG. 3A, the SMU 25 receives a service subscription request from one of its end users such as end user 14. At step 42, the SMU multicasts the subscription request over the Enterprise LAN 11 to discover LUSs that have supplementary services. At step 43, an LUS such as Enterprise LUS 23 sends a list to the SMU 25 of all its supplementary services on the network, along with the addresses/URLs of other LUSs outside the enterprise with the same type of services. At step 44, the SMU uses the list to construct a service subscription form. At step 45, the SMU sends the form to the end user 14 with a list of the services available. At step 46, the user selects desired services from the form and supplies service-related data to the SMU. The SMU checks a user profile for the end user at 47 to determine services already in use by the user.

At step 48, the SMU determines whether or not a requested service is already in use. If a requested service is already in use, the process moves to step 49 where the SMU sends a notice to the user that the requested service is already provided, and the process stops. If the requested services are not already in use, the process moves to FIG. 3B.

At step 51 of FIG. 3B, the user determines whether or not all of his desired services are on the service subscription form. If not, the user sends a message at step 52 to the SMU 25 requesting a particular service or services. At step 53, the SMU queries LUSs outside the enterprise (such as LUS 18) using the addresses/URL previously obtained in step 43. At step 54, the LUS 18 downloads the proxy code for the requested service to the SMU. The process then moves to step 62.

However, if it is determined at step 51 that all of the user's desired services are on the service subscription form, the process moves to step 55 where it is determined whether or not the user's requested service(s) are available from the user's LUS. If so, the process moves to step 56 where the SMU sends a notice to the user that the service is available from the user's LUS. At step 57, the SMU sends a service request to the user's LUS. The process then moves to step 61. If some or all of the requested services are new to the user (i.e., the requested services are not available from the user's LUS), the process moves from step 55 to step 58 where the SMU sends a request to the LUS to download the proxy code of the services requested by the user.

At step 59, the LUS downloads the proxy code and then downloads the code to the SMU at step 61. At step 62, the gatekeeper 12 serving the user 14 then uses the proxy code to construct a USA, and to determine the location of the SIR 27 where the actual service code is stored. At step 63, the customized USA is sent to the user agency 14a, and resides on the user's terminal 14. At step 64, the user sends an acknowledgment to the SMU when the USA is received.

Figure 4:
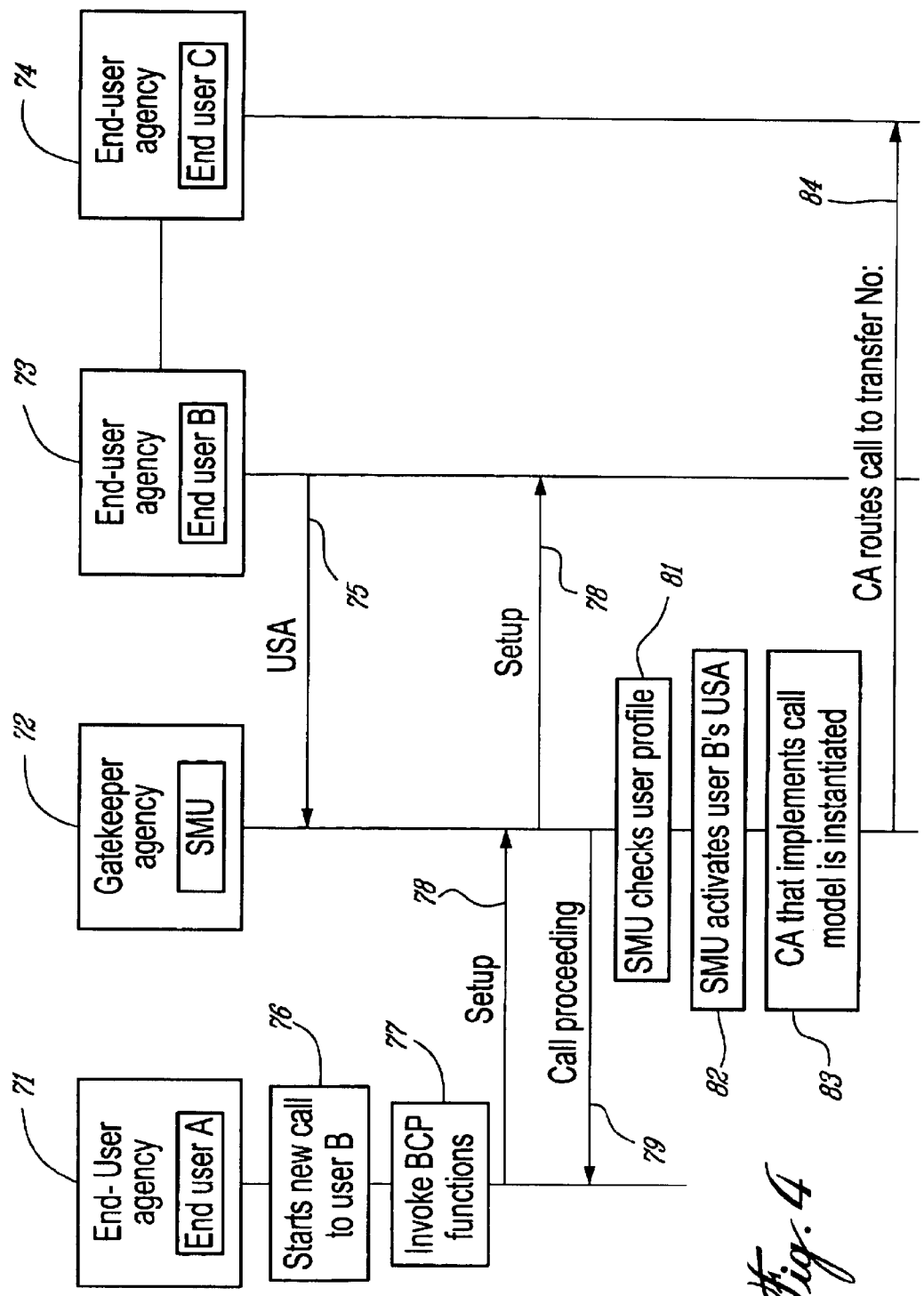
FIG. 4 is a sequence flow diagram illustrating the sequence of how a call is set up utilizing a User Service Agent (USA) and a Call Agent (CA) in the system of the present invention.

FIG. 4 is a sequence flow diagram illustrating the sequence of how a call is set up utilizing a User Service Agent (USA) and a Call Agent (CA) in the system of the present invention. In the illustrated sequence, End User A 71, being served by Gatekeeper and SMU 72, originates a call toward End User B 73. End User B subscribes to Call Forwarding Unconditional (CFU) and Call Transfer (CT) services with End User C 74 as the transfer number.

If the gatekeeper-routed call-signaling mode is utilized, the USA for End User B moves to the Gatekeeper Agency at 75. When End User A, who has not subscribed to any advanced services, starts a new call to End User B at 76, the Basic Call Processing (BCP) functions in the User A terminal are invoked at 77. As a result, a Setup message 78 is sent to End User B via the gatekeeper. The gatekeeper returns a Call Proceeding message 79 to End User A.

The SMU in the Gatekeeper Agency 72 then checks its user profile at 81. Since End User B subscribes to CFU and CT, then there must be a USA for End User B. Therefore at 82, End User B's USA is activated. At 83, a CA which implements the call model is instantiated. The USA may instantiate the CA, for example, by performing a newCallAgent(USA) routine. At this time, the USA and the CA are co-resident in the same agency. The CA obtains a handle of the USA so that these two agents can communicate with each other by method calls. The CA also makes use of the BCP functions available in the gatekeeper, and can also obtain the code needed for the advanced service through URLs provided by the USA. At 84, the CA then takes over the call processing (i.e., acts on behalf of End User B who has subscribed to the services) and routes the call to the transfer number at End User C.

It is thus believed that the operation and construction of the present invention will be apparent from the foregoing description. While the system and method shown and described has been characterized as being preferred, it will be readily apparent that various changes and modifications could be made therein without departing from the scope of the invention as defined in the following claims.

What is claimed is:

1. A method of creating subscriber services in an Internet Protocol (IP)-based telecommunications network, said method comprising the steps of:
  creating by a Service Component Creator (SCC), a service proxy object;
  posting by the SCC, the service proxy object to a Lookup Service (LUS), said LUS being accessible through the Internet;
  downloading through the Internet by an Enterprise Service Creator (ESC), the posted service proxy object;
  customizing by the ESC, the downloaded service proxy object to create a customized service for an end user;

uploading by the ESC, the customized service proxy object to an enterprise LUS; and downloading by the enterprise LUS, the customized service proxy object to a Service Management Unit (SMU) serving the end user.

2. The method of creating subscriber services of claim 1 wherein the user is served by a gatekeeper, and actual service code for implementing the customized service is stored in a Service Implementation Repository (SIR), the method further comprising the steps of:

determining by the gatekeeper, a location of the SIR utilizing the service proxy code downloaded to the SMU;

downloading by the gatekeeper, the actual service code from the SIR;

constructing by the gatekeeper, a customized User Service Agent (USA) that includes the actual service code; and sending the customized USA to an agency (mobile agent platform) at the user's terminal.

3. The method of creating subscriber services of claim 2 wherein the step of sending the customized USA to an agency at the user's terminal includes the steps of:

connecting the agency, the gateway, and the SMU to an Enterprise Local Area Network (LAN); and sending the customized USA to the agency over the Enterprise LAN.

4. A method of provisioning a supplementary service upon request from an end user in an Internet Protocol (IP)-based telecommunications network, said method comprising the steps of:

receiving in a Service Management Unit (SMU), a service subscription request from the end user;

multicasting by the SMU, the service subscription request over an Enterprise Local Area Network (LAN) to discover Enterprise Lookup Services (LUSs) that have supplementary services available for downloading;

sending by each Enterprise LUS, a list of its supplementary services to the SMU;

constructing by the SMU, a service subscription form listing the supplementary services available;

sending the service subscription form from the SMU to the end user;

receiving in the SMU, an indication of a service selected by the user, and service-related data entered by the user;

sending by the SMU, a service request to the LUS that contains the requested service;

downloading service proxy code for the requested service from the LUS to the SMU;

determining by a gatekeeper associated with the SMU and the end user, a cation of a Service Implementation Repository (SIR) storing actual service code for implementing the requested service;

downloading by the gatekeeper, the actual service code from the SIR;

constructing by the gatekeeper, a customized User Service Agent (USA) that includes the actual service code; and sending the customized USA to an agency at the user's terminal.

5. The method of provisioning a supplementary service of claim 4 further comprising, after the step of receiving in the SMU an indication of a service selected by the user, the steps of:

determining by the SMU, whether the requested service is already in use by the end user; and upon determining that the requested service is already in use by the end user;

sending a notice to the end user stating that the service is already provided; and stopping the provisioning method.

6. The method of provisioning a supplementary service of claim 4 wherein the indication of a service selected by the user indicates a particular service that is not on the service subscription form, the method further comprising, after the step of receiving the Indication In the SMU, the steps of:

sending by the SMU, unicast requests for the particular service to external LUSs outside the Enterprise LAN;

receiving a response from an external LUS indicating that the particular service is available; and downloading service proxy code for the particular service from the external LUS to the SMU.

7. A service creation architecture in an Internet Protocol (IP)based telecommunications network for creating subscriber services, said architecture comprising:

a Service Component Creator (SCC) for creating a service proxy object;

a Lookup Service (LUS) in which a service proxy object created by the SCC is posted, said LUS being accessible through the Internet by an Enterprise Service Creator (ESC);

an Enterprise Service Creator (ESC) having access to the LUS through the Internet, said ESC comprising:

means for downloading the posted service proxy object from the LUS; and means for customizing the downloaded service proxy object to create a customized service for enterprise users;

means for uploading the customized service proxy object from the ESC to an enterprise LUS; and means for downloading the customized service proxy object from the enterprise LUS to a Service Management Unit (SMU) serving the end user.

8. The service creation architecture of claim 7 further comprising:

a Service Implementation Repository (SIR) for storing actual service code for implementing the customized service;

means for downloading the actual service code from the SIR to a gatekeeper serving the end user;

a gatekeeper serving the end user, comprising:

means for determining a location of the SIR utilizing the service proxy code downloaded to the SMU; and means for constructing a customized User Service Agent (USA) that includes the actual service code; and means for sending the customized USA from the gatekeeper to an agency at the end user's terminal.

9. The service creation architecture of claim 8 further comprising an Enterprise Local Area Network (LAN) linking the agency, the gateway, and the SMU.

10. A system for provisioning a supplementary service upon request from an end user in an Internet Protocol (IP)-based telecommunications network, said system comprising:

a Service Management Unit (SMU) for receiving a service subscription request from the end user;

at least one Enterprise Lookup Service (LUS) that includes supplementary services available for downloading;

an Enterprise Local Area Network (LAN) linking the SMU, the LUSs, and the end user, said Enterprise LAN being utilized by the SMU to multicast the service subscription request to the LUSs;

means within each Enterprise LUS for sending a list of its supplementary services to the SMU;

means within the SMU for constructing a service subscription form listing the supplementary services available;

means for sending the service subscription form from the SMU to the end user;

means in the SMU for receiving an indication of a service selected by the user, and service-related data entered by the user;

means for sending by the SMU, a service request to the LUS that contains the requested service;

means for downloading service proxy code for the requested service from the LUS to the SMU;

a Service Implementation Repository (SIR) for storing actual service code for implementing the requested service;

a gatekeeper associated with the SMU and the end user, the gatekeeper including means for determining a location of the SIR;

means for downloading by the gatekeeper, the actual service code from the SIR;

means within the gatekeeper for constructing a customized User Service Agent (USA) that includes the actual service code; and means for sending the customized USA to an agency at the users terminal.

* * * * *